July 4, 1933.  Z. STARKS  1,916,868
PROTECTOR AND SUPPORTER FOR PLANTS
Filed Jan. 20, 1932  2 Sheets-Sheet 1
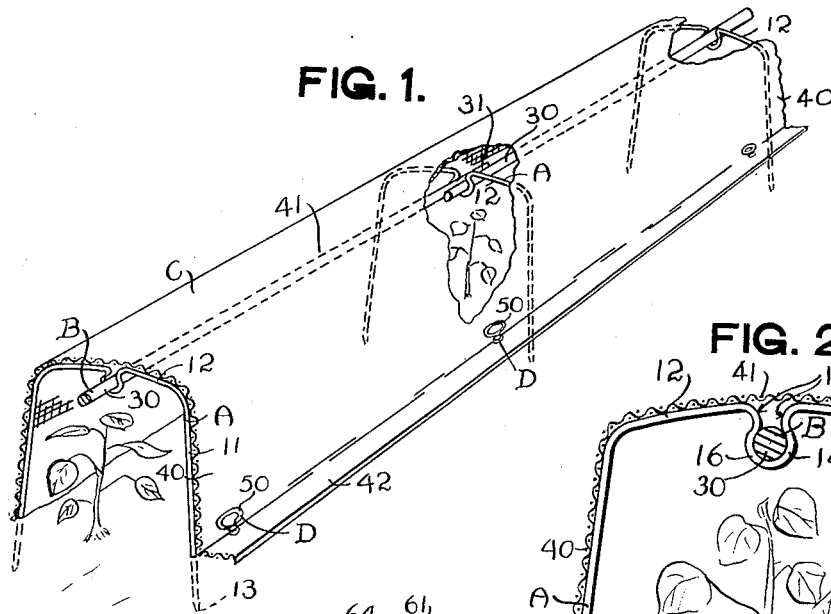
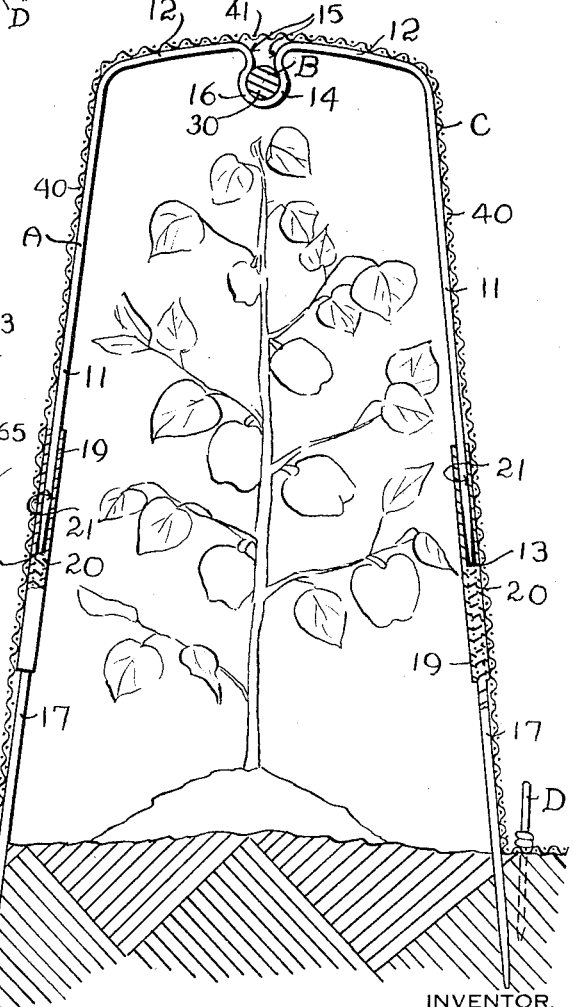
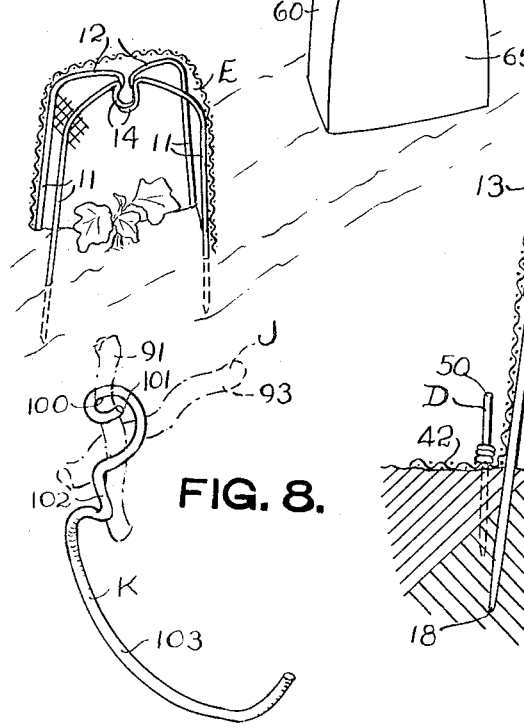
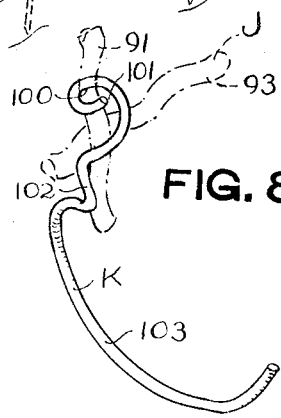
INVENTOR.
Zeston Starks
BY Lancaster, Allwine and Rommel
ATTORNEYS.

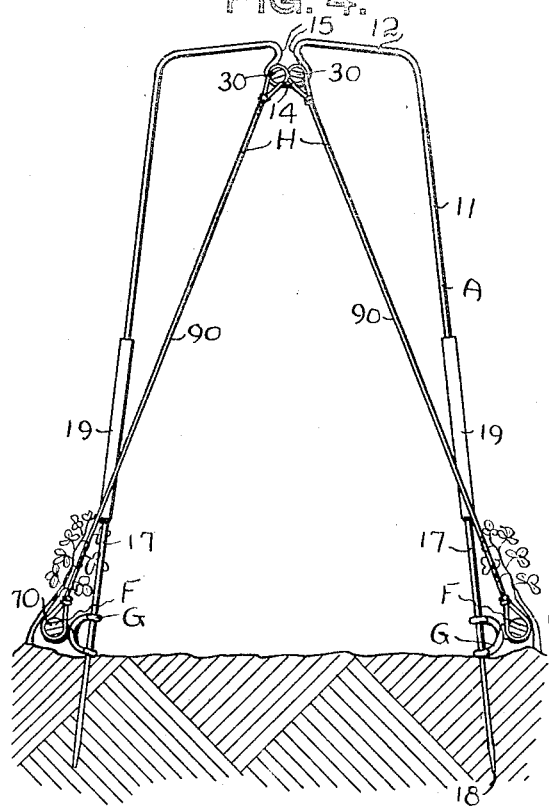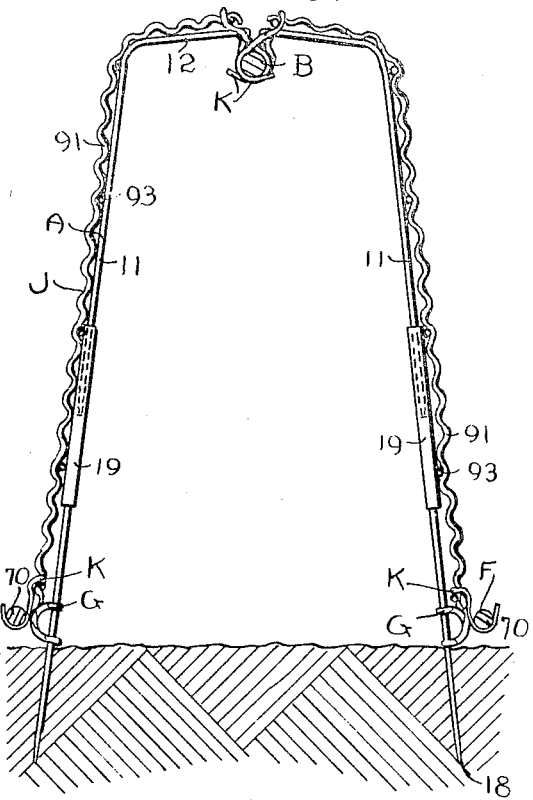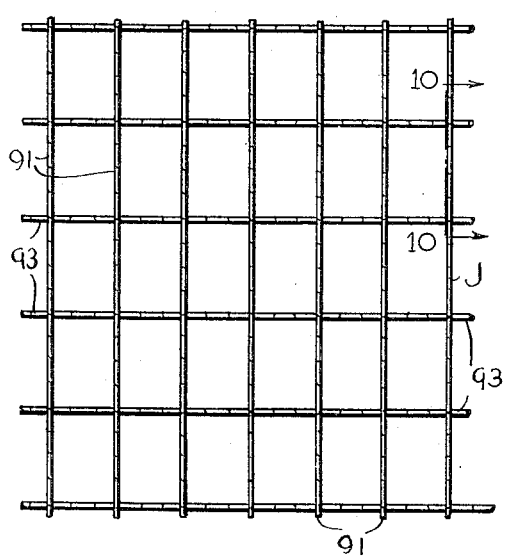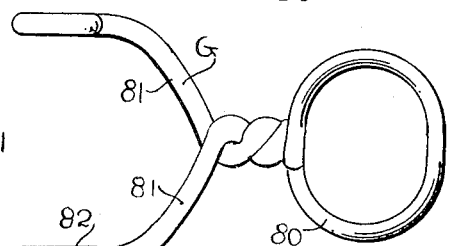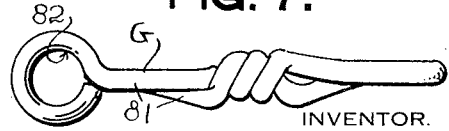

Patented July 4, 1933

1,916,868

UNITED STATES PATENT OFFICE

ZESTON STARKS, OF MALVERN, OHIO

PROTECTOR AND SUPPORTER FOR PLANTS

Application filed January 20, 1932. Serial No. 587,313.

This invention relates to protectors and supporters for plants, or devices for shielding and sheltering growing plants and their fruits and flowers, during various stages of their growth, from the sun, rain, hail, frost, wind, insect enemies, birds and the like, as well as devices for supporting plants during their growth. This invention embodies improvements and additions to the device disclosed in my co-pending application, Serial No. 552,034, filed July 20, 1931.

An object of the invention is to provide a plant protector which renders unnecessary spaced apart holes made in a protective covering forming a part of the device, in order to employ it.

Another object is to provide a plant protector having a covering which is not secured to its support and which covering may be stretched away from the supports so as to cover more ground.

Another object is to provide an adjustable device of this kind which will function to protect young plants, just set out, or dwarf plants, as well as the same plants at maturity or during intermediate stages of their growth, since young plants may take up but little space and are usually dwarf, while the same plants at maturity may have grown several feet in height and increased in girth.

Still another object is to provide a device of this kind which may be converted into a support for a trellis on which plants may climb or be tied.

Another object is to provide a device of this kind which is inexpensive to manufacture and which may be packed, shipped and stored so as to occupy but little space.

Still a further object is to provide a novel carrier for anchor poles associated with the device.

Another object is to provide a novel hold down for a trellis for climbing plants and the like, associated with the device.

Another object is to provide a novel trellis associated with the device.

Other objects and advantages of the invention will be apparent during the course of the following detailed description, taken in connection with the accompanying drawings forming a part of this specification and in which drawings:—

Figure 1 is a perspective view showing the improved plant protector associated with a row of young or low growing plants.

Figure 2 is an elevation of the device associated with mature or high growing plants, parts of the device being broken away to better illustrate portions of the construction.

Figure 3 is a perspective view of the device associated with young plants grown on relatively distantly spaced hills.

Figure 4 is an elevation of the device employed as a support for climbing plants.

Figure 5 is an elevation of the device employing a trellis as a support for plants.

Figure 6 is a side elevation of an anchor pole carrier associated with the device.

Figure 7 is a top plan view of the same.

Figure 8 is a perspective view of a trellis hold down associated with the device.

Figure 9 is a side elevation of a novel trellis associated with the device.

Figure 10 is an enlarged sectional view on the line 10—10 of Figure 9.

In the drawings, wherein like reference characters designate corresponding parts thruout the several views, the letter A may generally designate the support, B a ridge pole, C a plant protective covering for the support and ridge pole, D covering hold down means, E an individual plant protective covering for the support, F an anchor pole, G an anchor pole carrier, H a support for vines and the like, J another support for vines and the like, and K a support hold down means associated with the support J.

The support A preferably comprises an inverted U-shaped body having main leg portions 11 and a bight portion 12, which latter forms a substantially laterally projecting extension for an end of each of the leg portions, constructed of a single length of heavy but resilient wire or rod. The free ends of the leg portions may be pointed as at 13 and the legs may diverge outwardly from the bight portion 12 as shown in Figure 2. The intermediate portion of the bight portion 12 is provided with a substantially U-shaped socket or carrier 14 for a ridge pole or poles.

The socket is formed so that its mouth 15 is normally restricted and is of a less width than its body portion 16, but since the device is preferably constructed of resilient material, the mouth may be temporarily enlarged to permit a ridge pole, of a diameter greater than the width of the mouth (as shown in Figure 2) to be inserted thru the mouth and likewise the body may be enlarged as shown in Figure 4 to accommodate the diameters of two ridge poles. In either case it will be noted that the ridge pole or poles are carried below the mouth 15 of the socket which mouth is rounded and that there are no projections whatever to interfere with the plant protective covering for the support, neither is the covering weakened by holes which are frequently found in the employment of other types of supports, and will lie smoothly over the support.

The support is provided with auxiliary legs 17 which may be pointed at one end as at 18 while the opposite end of each is preferably provided with a collar 19 which may be welded to the leg 17 as shown at 20 and extends beyond the end of the leg forming a socket 21 which accommodates the free end of the leg portion 11 and is comparatively deep. These auxiliary legs 17 may be constructed of rods or heavy wire similar to or heavier than the body forming the legs 11 and bight portion 12, while the collar may comprise sheet metal, rolled into a tube.

The ridge pole B may be an elongated wooden rod or pole 30 such as is generally available on farms and in woodlands, and two may be accommodated within a socket 14 if necessary for strength or where one pole ends and another is added to continue this feature, as shown at 31 in Figure 1.

As for the plant protective covering C, this may comprise lengths of any flexible material such as canvas, burlap cloth or the like untreated or treated so as to render it transparent, heavy paper and netting. When adjusted on the support it will present sloping faces 40, ridge pole covering portions 41 and ground engaging portions 42.

The covering hold down means D preferably comprises a single length of wire bent to form an open handle portion 50 and a shank portion.

The individual plant protective covering E is adapted to be supported by preferably two supports A, minus the auxiliary legs 17, crisscrossed with one socket 14 within the other. This covering may be of material similar to the covering C and presents sloping faces 60 and a rounded face 61 and may be made up of four sections 62, 63, 64 and 65 suitably secured together.

The anchor poles F may be ordinary wooden poles or rods 70, similar to the ridge poles B.

As for the anchor pole carriers G, each of these may be constructed of a single length of wire bent and twisted to form an elongated loop 80 with the free ends of the wire forming parallel bowed arms 81 terminating in eyes 82, having their axes at a right angle to the axis of the loop 80. The eyes 82 are of a circumference sufficient to accommodate the legs of the device so that the carrier may be slid along the legs but when an anchor pole is within the loop 80, the weight will cause the inner surface of portions forming the eyes to bind against the legs and maintain the poles and carriers in their proper positions with respect to the legs.

The support H for vines and the like may be cords 90, or similar means, secured between the ridge poles and the anchor poles, paralleling each other and spaced a proper distance apart.

As for the support J for vines and the like, this is of novel construction and comprises parallel lengths of preferably corrugated stay wires 91 which may be welded as at 92 to parallel lengths of preferably corrugated line wires 93 positioned at right angles to the stay wires 91. The wires 91 and 93 are preferably flexible and adapted to shape themselves over the support A as shown in Figure 5. This trellis may be of any length and width found expedient and the spacing of the wires may vary, but the wires are ordinarily spaced much farther apart than in ordinary wire fencing, and the trellis is in no way a fence, but a support particularly adapted for this device. Owing to the corrugations, vines will find a better hold and the crossed wires will afford a point where bands or the like may be secured to be employed in tying plants to the trellis. As noted in Figure 8 where a fragment of the trellis is shown in dotted lines, both wires are employed to carry the support hold down means.

The support hold down means K is preferably made of a single length of wire one end of which is bent to form an eye portion 100 with the extremity of that end spaced from the other portions of the wire forming the eye, so that a space 101 is left which will permit the wires 91 or 93 to be inserted into the eyes. From the eye portion 100 the wire forming the support hold down means parallels the axis of the eye as shown at 102 and is then formed into a concaved portion 103 disposed with its major axis at a right angle to the axis of the eye, forming a portion shaped to extend partly about an anchor pole or a ridge pole as shown in Figure 5.

In the several uses of the device, it may be employed first as a protector for dwarf or young plants when first set out, and the user sets a sufficient number of the supports over the row of plants by inserting the legs 11 into the ground, spacing the supports such distances as the lay of the ground and its condition affords. Next the user inserts the ridge pole into the socket 14, as shown in Figure 1, the portions 15 of the sockets moving away from each other as the pole is being pressed into the socket, and then springing back into place so that each pole or poles may be held securely in place in the sockets. When the ridge poles are in place the plant protective covering is laid over the ridge poles and the bight and leg portions of the supports. If the plants are not large in circumference, the covering may lie against the legs and be pegged down at convenient intervals by punching the shank of the protective covering hold down means D thru the ground engaging portions 42 of the covering and into the ground. The elongated handle of the covering hold down means, when in contact with the protective covering, prevents it from tearing out of the hole made by the shank. If the plants are rather large in circumference and larger than the width of the supports, the covering may be stretched away from the legs as far as necessary and pegged down as before. Since any width covering may be employed, so as to extend outwardly along the ground as shown at 42 in Figure 1, small animals, birds, and the like will not be apt to find places where they can crawl under the covering as might be the case if the covering extended only to the ground. Also since there are absolutely no parts of the support projecting thru the covering, no holes in the latter are necessary other than those made by the shanks of the covering hold down means, for moisture, insects, etc., to find ingress or to be torn by the wind.

When dismantling the protector, shown in Figure 1, the legs are withdrawn, the covering rolled up or otherwise compacted, the ridge poles withdrawn and stored or thrown away and the supports pulled up. The pegs and supports may be stored in a very small space by placing a number of supports together and slipping the elongated handles of several of the covering hold down means over the legs or bight portions of the supports.

Many plants do not reach maturity or may be at their best, when the first frost occurs and it is important that these plants be protected from the frost. It is also important in some cases that the fruit of these plants be protected from birds and animals. Since the mature plants frequently grow to a considerable height, the supports shown in Figure 1 could not be employed and consequently the auxiliary legs 17 are used in conjunction with the supports shown in Figure 1. Because the legs 11 diverge from the bight portions, it will be seen from Figure 2 that a considerable area can be covered by the protector as illustrated in Figure 2. In the use of the device as shown in Figure 2, the ridge poles are inserted as heretofore brought out, the protective covering placed over the supports, and ridge poles and pegged down as heretofore described. While it will be noted that the legs 11 have a snug fit within the sockets 21, the covering will aid in holding the legs 11 within the sockets. It is evident that, when no longer required, the protector as shown in Figure 2 may be dismantled as heretofore described and similarly stored, the auxiliary legs 17 being also slipped into the elongated handles of several of the covering hold down means.

Another use of the device is shown in Figure 3. Many plants which are small when young, cover a considerable ground area when older, such as cucumbers, winter squash and cantaloupes and the young plants are consequently spaced a considerable distance apart. Therefore, an economical arrangement is provided whereby two of the supports A, minus the auxiliary legs, are arranged with one socket within the other as shown in Figure 3 and a suitable covering placed over them. This device, of course, is removed when the plants grow older and begin to spread.

A still further use of the device is illustrated in Figure 4 where the supports A, ridge poles B, anchor poles F and anchor pole carriers G, and a support J for vines, are employed. It will be noted that the vines, such as pole beans may be grown in parallel rows as they climb up the cords 90 which are attached at one extremity to the ridge poles and at the opposite extremity to the anchor poles which are of course located adjacent the base of the plants. These anchor poles are placed in position by positioning the carriers G along the legs of the supports before the legs are inserted in the ground and it is apparent that these carriers may project either outwardly or inwardly as convenient since they may be rotated about the axis of the legs. The anchor poles are inserted into the loops of the carriers and the weight of the anchor poles, as heretofore brought out, will cause the opposite inner walls of each eye portion to engage the leg about which it is placed and prevent the anchor pole from slipping.

Figure 5 illustrates another novel arrangement, whereby the device is employed to support vines or plants which may require tying in order to support them,—such as tomatoes or some cucumbers which are sometimes preferably grown off the ground. It should be apparent, however, that the device as illustrated in Figure 5 may be employed with vines with tendrils or which entwine about the device. The supports are placed between two adjacent rows of plants or two adjacent rows of hills and the support K which preferably comprises the wire trellis described, is placed in position, one trellis on each side or one trellis may be carried over the support A from side to side. However, it is preferred that a trellis be used on each side of the support, extending from the ridge poles to the anchor poles.

So that the trellis may be held in position, the hold down means K is employed with the concaved portion of the hold down means about the anchor and ridge poles and the eye portion about the upright or stay wires of the trellis as shown in Figure 8.

It will be noted that the anchor pole carriers may be set along the legs at a convenient position so that the trellis may commence some distance from the ground permitting cultivation.

This novel trellis is adapted for use with the supports A and with the novel hold down means provided and its construction is such that it will conform to the contour of the supports as shown in Figure 5.

The shape of the support hold down means K is such that it will not become easily detached from the trellis, the anchor or ridge poles since the eye 101 is about an upright stay wire 91 of the trellis, the straight portion 102 of the support hold down means presses against the horizontal line wires 93 and the concaved portion 103 is generally tight against the periphery of the anchor or ridge poles.

Changes in detail may be made to the form of invention herein shown and described, without departing from the spirit of the invention or the scope of the following claims.

What is claimed is:

1. As an article of manufacture, a trellis support comprising a single length of wire bent to form a leg portion, a substantially laterally projecting extension therefrom, and a U-shaped ridge pole receiving socket in the extension substantially midway the ends thereof, said socket opening upwardly with its axis substantially vertical and having a normally restricted mouth.

2. In a combined plant support and plant protective covering support, a leg portion, a substantially laterally projecting extension therefrom, means securing a ridge pole to said extension, an anchor pole, and means slidable along said leg portion securing said anchor pole to said leg portion.

3. In a combined plant support and plant protective covering support, a leg portion, a substantially laterally projecting extension therefrom, means securing a ridge pole to said extension, an anchor pole, means securing said anchor pole to said leg portion in adjustable positions along and to any side of said leg portion, a trellis, and means securing said trellis to said ridge pole and to said anchor pole.

4. In a combined plant support and plant protective covering support, a body portion provided with a leg, means securing a ridge pole to said body portion, an anchor pole, means slidable along said leg carrying said anchor pole, a plant support extending from said ridge pole to said anchor pole, and means securing said plant support to said ridge pole and to said anchor pole.

5. In a combined plant support and plant protective covering support, a body portion provided with a leg, means securing a ridge pole to said body portion, an anchor pole, means slidable along said leg carrying said anchor pole, a plant support extending from said ridge pole to said anchor pole, and means securing said plant support to said ridge pole and to said anchor pole including a coupling member having an eye receiving a portion of said plant support and a concaved portion disposed about a portion of either of said poles.

6. As an article of manufacture, a trellis hold down for plant supports comprising a single length of wire bent to form an eye at one end thereof, a straight portion substantially parallel to the axis of said eye, and a concaved portion, with the straight portion intermediate said eye and concaved portion.

7. As an article of manufacture, a trellis hold down for plant supports comprising a single length of wire bent to form an eye at one end thereof, a straight portion substantially parallel to the axis of said eye, and a concaved portion, with the straight portion intermediate said eye and concaved portion and the concaved portion disposed with its major axis at substantially a right angle to the axis of said eye.

ZESTON STARKS.